US005157952A

United States Patent [19]

Lin

[11] Patent Number: 5,157,952

[45] Date of Patent: Oct. 27, 1992

[54] TUBULAR DOOR LOCK

[76] Inventor: Jui C. Lin, No. 55-10 Been Chou Rd., KangShan, Kaohsiung Hsien, Taiwan

[21] Appl. No.: 735,263

[22] Filed: Jul. 24, 1991

[30] Foreign Application Priority Data

Feb. 28, 1991 [TW] Taiwan .............................. 80202361

[51] Int. Cl.[5] .............................................. B60R 25/02

[52] U.S. Cl. ....................................... 70/216; 70/224; 70/223; 70/465

[58] Field of Search .................. 70/209, 210, 215-217, 70/220-224, 451, 465, 466, 461

[56] References Cited

U.S. PATENT DOCUMENTS

| | | | |
|---|---|---|---|
| 2,450,840 | 10/1948 | Milligan | 70/223 X |
| 2,497,328 | 2/1950 | Smith et al. | 70/223 X |
| 2,611,635 | 9/1952 | Cerf, Jr. | 70/465 |
| 2,702,466 | 2/1955 | McConnell | 70/465 |
| 2,729,090 | 1/1956 | Floraday | 70/223 |
| 2,738,665 | 3/1956 | North et al. | 70/465 |
| 2,795,129 | 6/1957 | Schoepe | 70/216 X |
| 2,870,621 | 1/1959 | Schoepe | 70/451 X |
| 2,966,054 | 12/1960 | Muttart | 70/216 X |
| 2,983,537 | 5/1961 | Kubik | 70/216 X |
| 3,136,572 | 6/1964 | Lytle | 70/451 X |
| 3,800,573 | 4/1974 | Babb, Jr. et al. | 70/217 |
| 3,896,644 | 7/1975 | Nagy et al. | 70/222 X |
| 3,896,645 | 7/1975 | Nagy et al. | 70/223 X |
| 3,922,896 | 12/1975 | Kagoura | 70/223 |

*Primary Examiner*—Renee S. Luebke
*Assistant Examiner*—Suzanne L. Dino
*Attorney, Agent, or Firm*—Jacobson, Price, Holman & Stern

[57] ABSTRACT

A tubular door lock having a kind of structure, wherein locking the lock by an inner knob is accomplished by first pressing and subsequent rotating of said knob, and unlocking by said knob can be done only be rotating of said knob.

3 Claims, 4 Drawing Sheets

TUBULAR DOOR LOCK

BACKGROUND OF THE INVENTION

A conventional tubular door lock has an inner knob provided with a turning button, which is rotated to lock the lock from inside. So, when the lock in locked condition is to be unlocked, at first the turning button has to be rotated back and then the inner knob can be rotated to open the door. In emergency, the lock can delay a person attempting to escape from a room or a house in opening the door equipped with it.

Some tubular door locks used in a rest room are improved to have a press button instead of a turning button in the inner knob, which is more convenient to open the door. But for little children or feeble persons, it is still somewhat unsafe, because the lock once locked needs a little force to rotate the inner knob to unlock it, while it is rather easy to press down the press button to lock it from inside.

SUMMARY OF THE INVENTION

In view of a disadvantage of conventional tubular door locks pointed out above, this invention has been devised to supply a tubular door lock which requires a certain force in locking it, in order to prevent it from being easily locked by some mistake. Then it can be unlocked only by a person who has enough force to lock it.

A tubular door lock in accordance with the present invention comprises an outer knob, an inner knob and an inner bearing plate as the main components.

To lock it from inside, the inner knob has to be first pressed forward and then to be rotated clockwise, forcing projections of a position ring then staying in lengthwise sections of two L-shaped opposite slots in an inner cylinder to move to the bottoms of lateral sections of the L-shaped opposite slots, and at the same time the inner cylinder pushes forward an actuating plate to move its four feet into four holes in a position plate. As a square shaft connected with and to move the dead bolt of this lock passes through a central square opening in the actuating plate, the square shaft can not be turned together with the actuating plate, which is stopped by the position plate. Therefore, this lock becomes locked.

To unlock this lock in locked condition from inside, only turning the inner knob counterclockwise can do it, because the inner knob turned can make the inner cylinder to retreat, and then the actuating plate can be pushed back by a spring positioned between the actuating plate and the position plate, freeing the actuating plate to be rotated to move the square shaft to release the dead bolt.

DETAILED DESCRIPTION OF THE INVENTION

Figure 1:
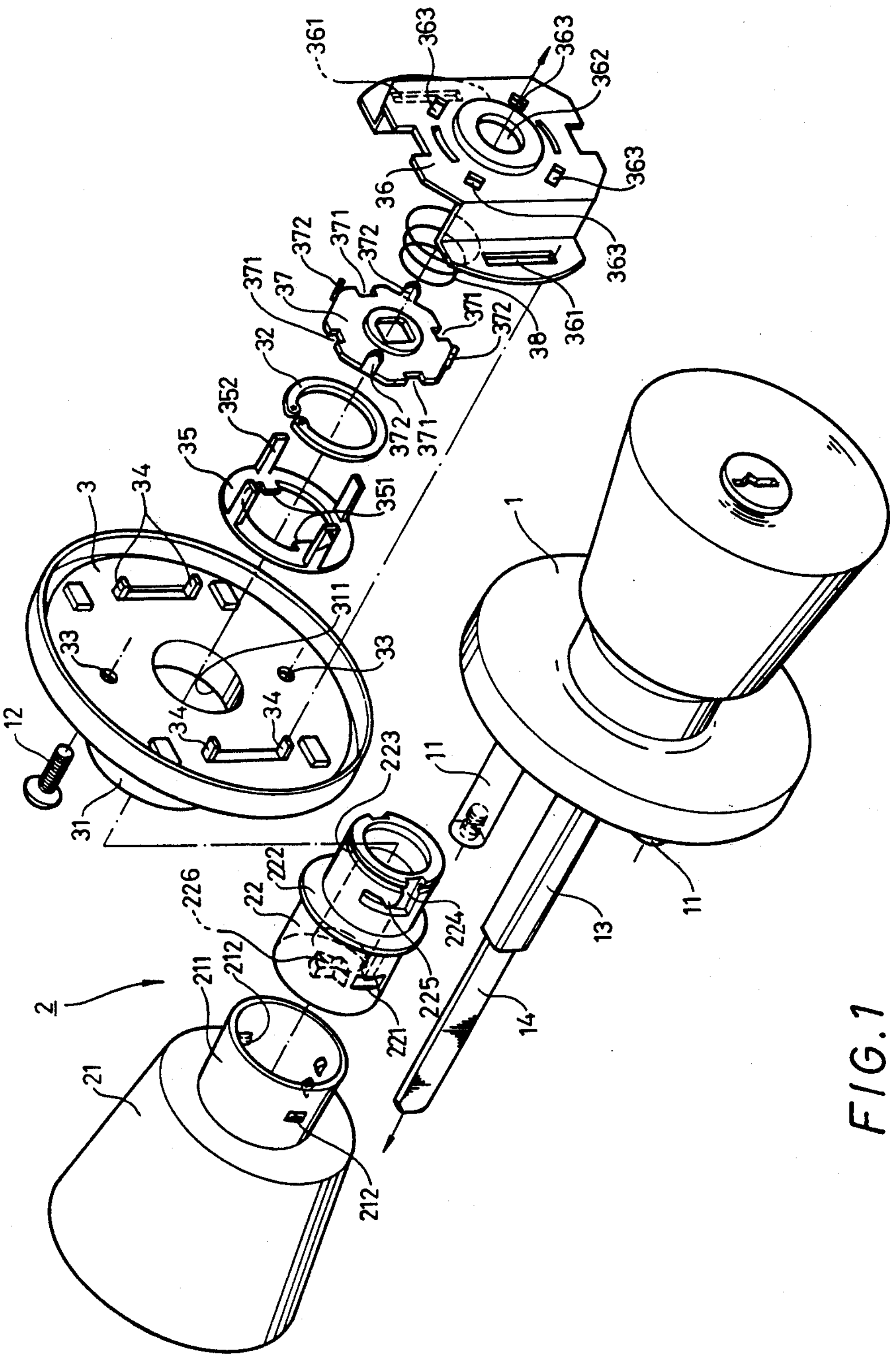
FIG. 1 is an exploded perspective view of a tubular door lock in the present invention.

A tubular door lock in accordance with the present invention, as shown in FIG. 1, comprises an outer knob 1, an inner knob 2 and an inner bearing plate 3 as the main components.

The outer knob 1 is provided with two posts 11 having a distal female-threaded hole extending lengthwise for screws 12 to connect the inner knob 2 and the inner bearing plate 3 with the outer knob 1. The outer knob 1 has a conventional structure provided with a key hole or not, to be rotated by a square shaft 13 and controlled to be rotated or not by means of a control bar 14 in the square shaft 13, which is to be rotated by a key or a tool. Its detail is omitted here.

The inner knob 2 and the inner bearing plate 3 are fixed on the inside of a door. The inner knob 2 comprises a knob body 21 and an inner cylinder 22. The knob body 21 has a tubular shaft 211 to fit around the inner cylinder 22, and the tubular shaft 211 has a pressed recess 212 to fit in a groove 221 in the inner cylinder 22 so as to unite the knob body 21 with the inner cylinder 22.

The inner cylinder 22 has an annular ridge 222 extending upright around the outer surface, and the annular ridge 222 fits and moves back and forth in the inner diameter of a tubular shaft 31 of the inner bearing plate 3, able to be stopped by a smaller-diameter edge 311. The inner cylinder 22 also has an annular groove 223 near one end for a C-shaped ring 32 to embrace so as to hold together the inner knob 2, the inner cylinder 21 and the inner bearing plate 3. The inner cylinder 22 also has two opposite L-shaped slots 224 which have lengthwise sections perpendicular to the annular groove 223, and lateral sections being parallel with the said groove 223 and being provided with a projecting stopper 225 in the lateral sections. The inner cylinder 22 has a central cavity for the square shaft to insert through and an 8-shaped fan-like hole 226 for a control bar 14 to pass through.

The inner bearing plate 3 is provided with a tubular shaft 31 extending axially towards the inner knob 2 for uniting with the inner cylinder 22 and the knob body 21, two opposite holes 33 for screws 12 to pass through to screw with the posts 11 of the outer knob 1, and two pairs of opposite projections 34 to insert in both ends of two upright slots 361 in a position plate 36 for fixing securely said position plate 36 by bending down said projections 34 on said plate 36. After the inner cylinder 22 is assembled with the inner bearing plate 3, a position ring 35 is first fixed around the inner cylinder 2, having two radially inward projections 351 fitting in the L-shaped slots 224 thereof, and then a C-shaped ring 32 is to be put to engage with the annular groove 223 of the inner cylinder 22.

The position ring 35 has two radially inward opposite projections 351 to fit and move in the two L-shaped slots 224 and four feet 352 extending axially outward and passing through four notches 371 provided around an actuating plate 37 and having their ends resting on the inner wall of the position plate 36.

The position plate 36 is provided with two upright opposite slots 361 for the two pairs of projections 34 of the inner bearing plate 3 to insert through both ends thereof so as to assemble the position plate 36 with the inner bearing plate 3, a central opening 362 for the square shaft 13 of the outer knob 1 to pass through and four holes 363 properly spaced around for four feet 372 of a actuating plate 37 to move in and out. A coiled spring 38 is placed around the square shaft 13 between the position plate 36 and the actuating plate 37 so that the feet 372 can move out of the four holes 363 in the position plate 36 elastically pushed by said spring 38.

The actuating plate 37 is provided with a square central opening for the square shaft 13 to extend through, four notches 371 around the circumferential edge for four feet 352 of the position ring 35 to extend through and four feet 372 extending lengthwise from the circumferential edge to move in and out of the four holes 363 in the position plate 36.

Figure 2:
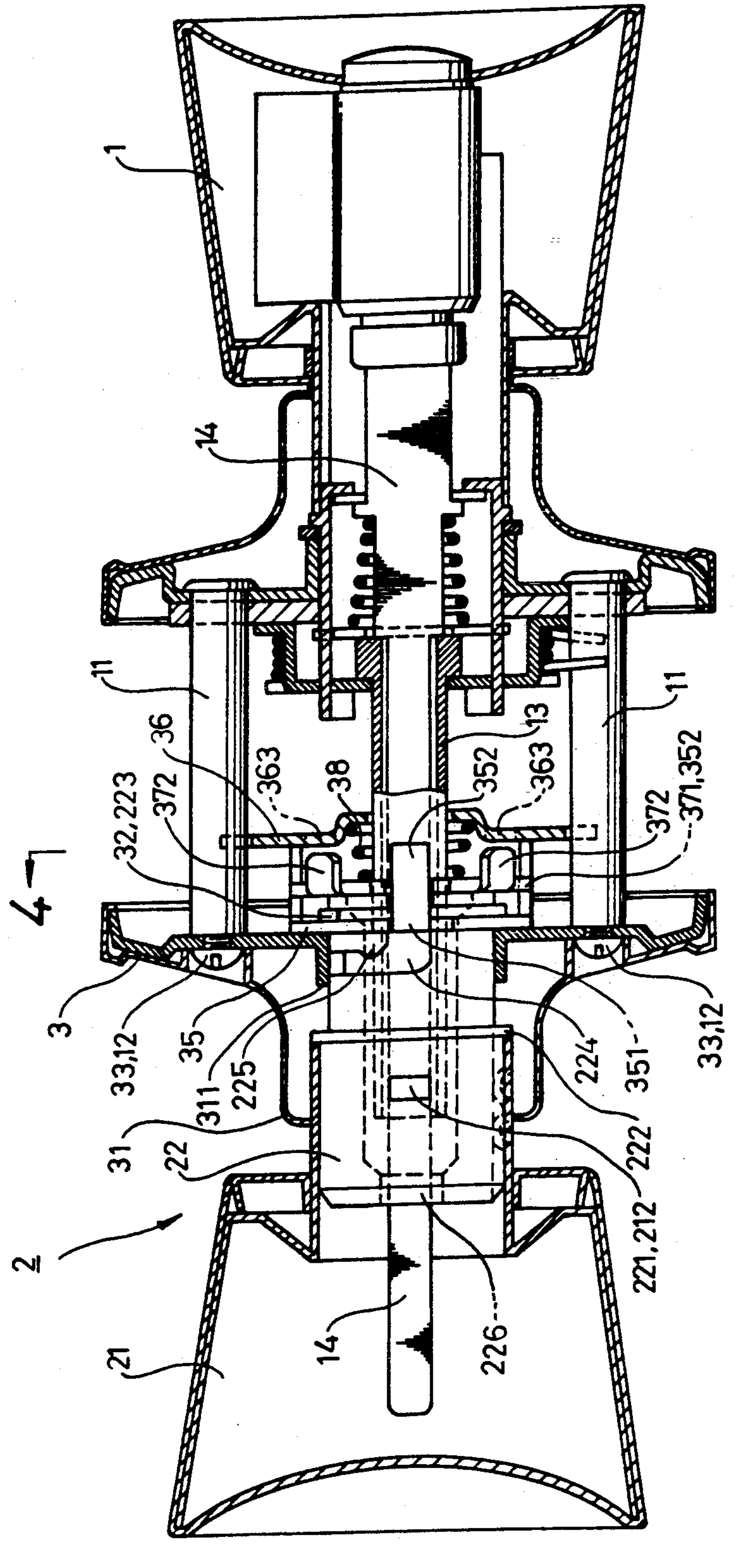
FIG. 2 is a cross-sectional view of a tubular door lock wholly assembled in the present invention.

The tubular door lock in unlocked position in this invention is shown in FIG. 2. Then the spring 38 lengthens to force the feet 372 of the actuating plate 37 move out of the holes 363 in the position plate 36 and the actuating plate 37 pushes the inner cylinder 22 together with the inner knob body 21 to move outward. Meanwhile, the projections 351 of the position ring 35 are inserting in the lengthwise sections of the L-shaped slots 224 and near the C-shaped ring 32. Under this unlocked position, the outer and the inner knob 1 and 2 can be rotated to open the door. If the outer knob 1 is rotated, the square shaft 13 can also be rotated together. If the inner knob 2 is rotated, the square shaft 13 can also be rotated via the inner cylinder 22, the position ring 35 and the actuating plate 37.

Figure 3:
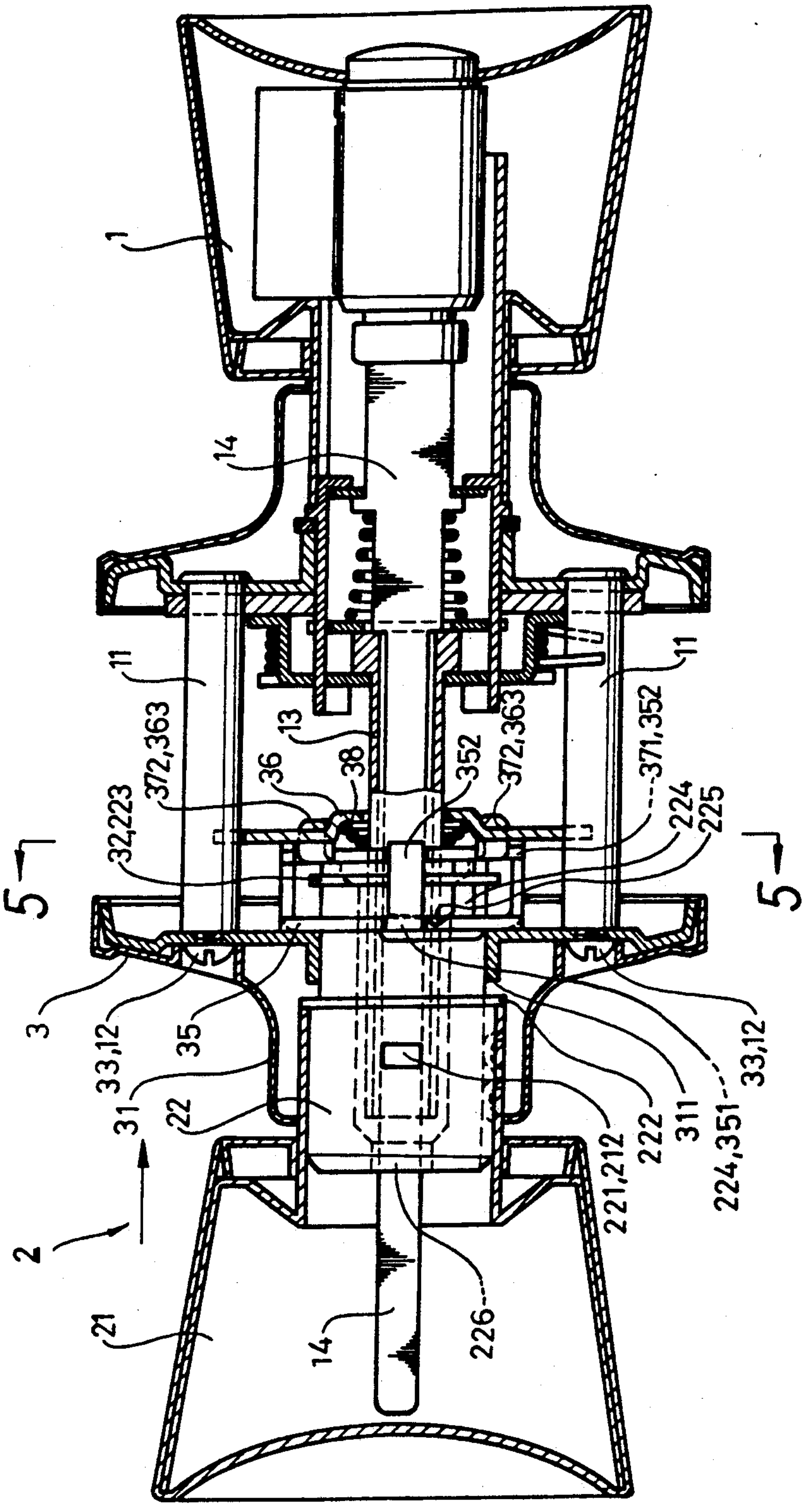
FIG. 3 is a cross-sectional view of a tubular door lock in locked position in the present invention.
Figure 5:
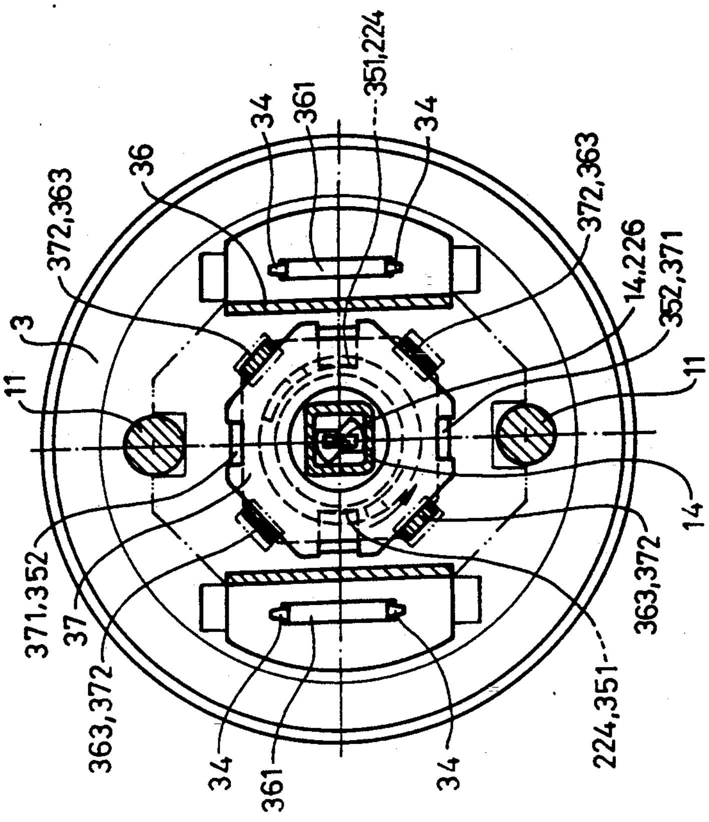
FIG. 5 is a cross-sectional view of line 5—5 in FIG. 3.
Figure 4:
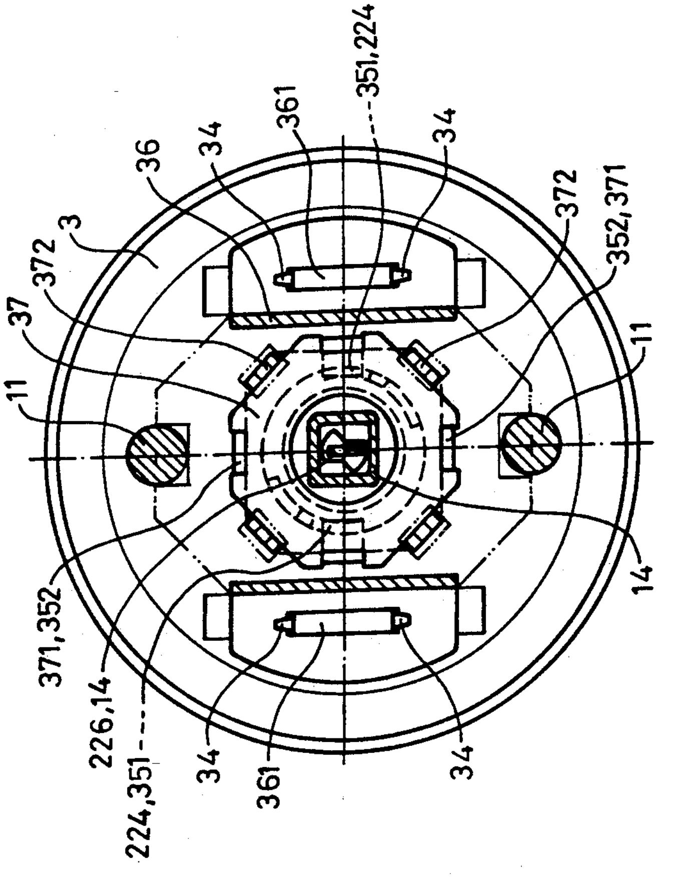
FIG. 4 is a cross-sectional view of line 4—4 in FIG. 2.

FIG. 3 shows the tubular door lock in locked position, which is achieved by first pressing and subsequent clockwise rotating of the inner knob body 21. Then the upper ends of the lateral sections of the L-shaped slots 224 are moved to be stopped by the projections 351 of the position ring 35, unable to retreat stopped also by the stoppers 225. At the same time, the inner cylinder 22 has pressed forward the actuating plate 37, the feet 372 of which have moved in the holes 363 in the position plate 36 as shown in FIG. 5. Under this locked position, the outer knob 1 cannot be rotated to turn the square shaft 13, because the actuating plate 37 fixed on the square shaft 13 is stopped by the position plate 36. Then said shaft 13 cannot be rotated by the outer knob 1 to move the dead bolt to unlock this lock. So, if this lock in locked position is to be unlocked from the outside, a correct key has to be used to turn the control bar 14 clockwise as shown in FIG. 5. Then the control bar 14 can rotate the inner cylinder 22, forcing the projections 351 to move in the lengthwise sections of the L-shaped slots 224 and freeing the actuating plate 37 and the spring 38, which lengthens to allow the feet 372 to move out of the holes 363, to resultant unlocking.

In order to unlock this lock in locked position from the inside, only rotating the inner knob body 21 enables the inner cylinder 22 to rotate, and consequently the projections 351 are to be moved in the lengthwise sections from the lateral sections of the L-shaped slots 224, and the spring 38 forces the feet 372 to move out of the holes 363. Then the lock is to be unlocked.

What is claimed is:

1. A tubular door lock comprising:

an outer knob provided with two lengthwise posts having distal female-threaded holes for screws to combine with an inner knob body, a square shaft extending from the outer knob, said square shaft having a control bar to be rotated by a key;

an inner knob provided with a knob body and an inner cylinder united with the knob body to move together, said inner cylinder provided with (1) an annular ridge on the outer surface, (2) an annular groove at an outer end thereof, (3) two L-shaped slots having lengthwise sections perpendicular to the annular groove and lateral sections and (4) a bottom with a hole for the control bar to extend in;

an inner bearing plate provided with a tubular shaft for receiving the inner cylinder, the tubular shaft receiving said annular ridge and allowing back and forth movement of the inner cylinder, the inner bearing plate having an aperture through which the inner cylinder extends and which forms a stop for said annular ridge, inseparably the inner cylinder with the inner bearing plate;

a position ring fitted around the inner cylinder inwardly of the C-shaped ring and provided with (1) two radially inward opposite projections to extend and move in said L-shaped slots, and (2) lengthwise feet extending away from the inner bearing plate;

a position plate having legs by which the position plate is attached to the inner bearing plate so that the position plate stands away from the inner bearing plate, holes in the position plate, an actuating plate positioned between the C-shaped ring and the position plate and provided with (1) notches for the feet of the position ring to extend through and (2) feet able to move in and out of the holes in the position plate;

a coiled spring placed around the square shaft between the position plate and the actuating plate for usually forcing the actuating late to move its feet out of the holes in the position plate; and said inner knob being pressed first and then rotated clockwise to move said projections of the position ring from the lengthwise sections of the L-shaped slots in the inner cylinder to upper ends of the lateral sections of said slots, and said inner cylinder being able to press forward the actuating plate to move the feet of said actuating plate into the holes in the position plate, said outer knob being able to be prevented by said actuating plate from rotating, said square shaft being able to be prevented from rotating together with said outer knob for locking the lock; said inner knob being directly rotated counterclockwise to move said projections of the position ring from the upper ends of said lateral sections of the L-shaped slots of the inner cylinder back into said lengthwise sections of the L-shaped slots so that the actuating plate can be pushed by the spring and the feet of said actuating plate can then move out of the holes in the position plate, for unlocking the lock.

2. The tubular door lock as claimed in claim 1, wherein said hole at the bottom of the inner cylinder comprises a figure-8 fan-like hole for the control bar to extend in to rotate said inner cylinder.

3. The tubular door lock as claimed in claim 1, wherein said lateral sections of the L-shaped slots in said inner cylinder are each provided with a stopper extending therein for the two opposite projections of the position ring to pass over when moving in the L-shaped slots.

* * * * *